United States Patent [19]
Olofsson

[11] Patent Number: 4,781,778
[45] Date of Patent: Nov. 1, 1988

[54] METHOD FOR MANUFACTURING IN WOOD CASES USED WITHIN THE TELECOMMUNICATIONS INDUSTRY

[76] Inventor: Stig Olofsson, Televerkets Industridivision, Box 1001, S-149 ol Nynsähamn, Sweden

[21] Appl. No.: 1,479

[22] Filed: Jan. 8, 1987

Related U.S. Application Data

[63] Continuation-in-part of Ser. No. 670,725, Nov. 13, 1984, abandoned.

[30] Foreign Application Priority Data

Nov. 16, 1983 [SE] Sweden .................................. 8306317

[51] Int. Cl.4 .......................... B27K 3/12; B27K 3/34; B27K 5/04
[52] U.S. Cl. ..................................... 156/196; 34/13.4; 34/16.5; 144/348; 144/380; 156/285
[58] Field of Search ............... 144/380, 381, 348, 349; 156/285, 286, 322, 196; 34/9.5, 13.4, 13.8, 16.5

[56] References Cited

U.S. PATENT DOCUMENTS

| | | |
|---|---|---|
| 1,066,523 | 7/1913 | Palen ..................................... 34/16.5 |
| 1,328,505 | 1/1920 | Fish . |
| 1,328,506 | 1/1920 | Fish . |
| 2,500,954 | 3/1950 | Loughborough et al. . |
| 3,675,336 | 7/1972 | Dedrick . |
| 3,862,375 | 1/1975 | Thomas . |
| 3,921,309 | 11/1975 | Nakayashiki .......................... 34/16.5 |
| 3,963,546 | 6/1976 | Roberti ................................ 144/348 |
| 4,182,048 | 1/1980 | Wolfe ..................................... 34/13.4 |
| 4,246,704 | 1/1981 | Pagnozzi .............................. 34/16.5 |

*Primary Examiner*—Merrell C. Cashion, Jr.
*Attorney, Agent, or Firm*—Pollock, Vande Sande & Priddy

[57] ABSTRACT

Parts for a wooden casing, in particular in the form of a telephone apparatus case, are manufactured as follows. A piece of timber is dried inside an oven to a moisture content of about 4-5% with sufficient moisture content being left to avoid cell collapse in the timber. At the end of the drying period the temperature is raised causing the resin in the timber to flow out and seal the pitch fibers of the wood preventing the wood from reabsorbing moisture. A blank is taken from the dried timber and worked into the final shape of a casing. Any weak points in the casing are reinforced with a reinforcing material in the form of wood or some other material. The pores of the wood are then sealed with varnish.

7 Claims, 2 Drawing Sheets

METHOD FOR MANUFACTURING IN WOOD CASES USED WITHIN THE TELECOMMUNICATIONS INDUSTRY

This application is a continuation in part of U.S. patent application Ser. No. 670,725, filed Nov. 13, 1984, now abandoned.

TECHNICAL FIELD

The present invention relates to a method for producing a wood casing, in particular in the form of a telephone apparatus case, a hand microtelephone case or some other form of casing used in the telecommunications industry, such as a casing for telecommunications components, for example an operator's console. In conjunction with the aforementioned casing for a hand microtelephone, the process is best applied to hand microtelephone casings consisting of two mating parts which can be joined at a dividing plane along the longitudinal section of the hand microtelephone.

DESCRIPTION OF THE PRESENT INVENTION

Because the external volume may not be increased to any great extent as compared to that of similar apparatuses constructed from conventional materials, and because a large internal component space is required inside the casing, the finished casing will exhibit thin wall sections, for example at the push-button holes which make up the keyset. It is a purpose of the apparatus according to the invention that it be capable of satisfying strength requirements which are, for example, imposed on a telephone apparatus case when it is used in a normal environment. A telephone apparatus is subjected to rough useage within its normal day to day environment.

The wood used in a telephone apparatus case must also withstand moisture problems and it is therefore a disadvantage for cracking and deformation to occur in the wooden casing material as a result of moisture. The apparatus must also exhibit a long service life.

The present invention provides a method for producing a casing which will solve the problems outlined above. According to the present invention, an initial piece of timber from which the casing will be made is dried for a specified drying period inside an oven or other space until the moisture content in the wood is close to that corresponding to the cell collapse limit of the wood. At the end of the drying period the temperature within the oven or other space is increased to cause the resin in the wood to flow out. This flowing of resin seals the pith fibers of the wood and prevents the wood from re-absorbing moisture.

From the timber dried according to the invention, a blank is taken from which a part of the case is to be formed. The blank is worked into the final shape of the casing part so that any weak points in the casing are reinforced, preferably by glued cross-lamination, with a reinforcing material in the form of wood or some other material. The pores of the wood are then finally sealed with varnish.

In a further embodiment of the present invention, the timber is dried for a drying period of from about 5 to about 75 days, depending on the type of wood being used. The drying periods should take place preferably in cycles which include first heating and then creation of a vacuum.

During the initial stage of the drying period the core of the timber itself is heated to a first temperature. The timber is then subjected to a vacuum for a first period. This vacuum treatment causes the moisture to move away from the inside of the timber and is then evaporated from the external surface. A cycle of this kind, consisting of thorough heating and exposure to vacuum, is followed by a number of similar cycles during the drying period.

Preferably, the timber should be dried to until it has a moisture content of only about 4 to 5% by weight in its finished dried state, so that only enough moisture is retained to prevent cell collapse. During the heating/vacuum cycles when the timber is being dried a first temperature of about 50° C. to about 65° C., preferably about 50° C., is used. At the end of this drying cycle the temperature is increased and a subsequent heating step is performed at a temperature of about 65° to 70° C. to achieve outflow of the resin from the wood. The upper temperature limit for resin sealing cannot be exceeded if the high quality of the wooden product is to be preserved. The preferred temperature for performing the heating step is 65° C. It is an important, novel feature of the method according to the present invention to provide a protective coating against moisture at such low temperatures. Consequently, the entire heat treatment of the timber is performed at very low temperature excluding any high temperature treatment such as for example steam blowing. A high temperature treatment would destroy the intended appearance of the wood and make it too brittle to be processed for manufacturing the product of the present invention.

In a further embodiment of the invention a blank may be a solid unit or may be composed (glued together) from two or more pieces of wood which are taken from the same plane or length of wood. A saving in timber material will be achieved which is important from practical manufacturing point of view, by gluing together two or more pieces of wood. Furthermore it is possible to make a better selection of the wood with regard to the volume of timber and the pattern of the wood grain.

Further embodiments of the invention also extend to blocking any internal stresses present in the wood which cause deformation and cracking by use of a reinforcing element, for instance solid wood or veneer, etc., which is attached to the surface of the affected casing. When veneer is used it is preferably a cross-laminated veneer.

The method of the present invention providing for heating and drying of the wood at these relatively low temperatures results in a wooden product exhibiting a deformation of less than 0.1%.

The production of the basic shape of the casing part, i.e, the milling or pressing of the internal cavity of the casing, is preferably done by mechanical means.

When the process according to the present invention is used for production of wooden casings for hand microtelephones, they are preferably made in the form of two long components which are joined along a longitudinal section or at a dividing plane in the longitudinal sense of the hand microtelephone. In order for the two components to be joined by clamping elements, the long components are made of different curved shapes at the joining area; the curved shape for the upper part will in this instance exhibit a smaller radius than the corresponding radius of the lower part. The long components are held tightly together by means of screws so that contact is provided over the entire longitudinal section, which insures reliable sealing of the microphone and ear-phone components.

The assembly of the microphone and ear-phone components is effected preferably by means of assembly screws which interact with a metal bushing in the correpsonding component. Assembling the components in this manner avoids the use of wood screws and allows repeated dismantling and assembling of the components without damage to the wood casing, which can occur if wooden screws are used in the handle at the ear-phone and microphone component positions.

A further embodiment of the present invention involves marking of the case or casing by hot-embossing.

The use of the process of the present invention for producing casing parts allows them to be used subsequently in a normal operating environment without the need of special handling, temperature and/or moisture requirements. Thus, for example, a telephone apparatus with a case of a fine-quality wood may be manufactured and may also be utilized as a subscriber apparatus capable of satisfying all the strength requirements necessary for such an apparatus. This process eliminates the risk of cracking to any portion of the casing, even if the apparatus is used in relatively damp areas. An apparatus manufactured from the wooden product obtained in accordance with the present invention satisfies very high stability requirements since its deformation due to the moisture conditions is about 0.1%. The apparatus will retain its finish and surface characteristics which make it attractive from the user's point of view.

The process according to the present invention permits production in various types of wood, for example, mahogany, walnut, curlygrained birch, wave-grained birch, sycamore, cherry or African rosewood, etc.

BRIEF DESCRIPTION OF THE DRAWINGS

A preferred embodiment of a method exhibiting the significant characteristic features of the invention is described below with simultaneous reference to the accompanying drawings, in which.

DESCRIPTION OF THE PREFERRED EMBODIMENT

Figure 1:
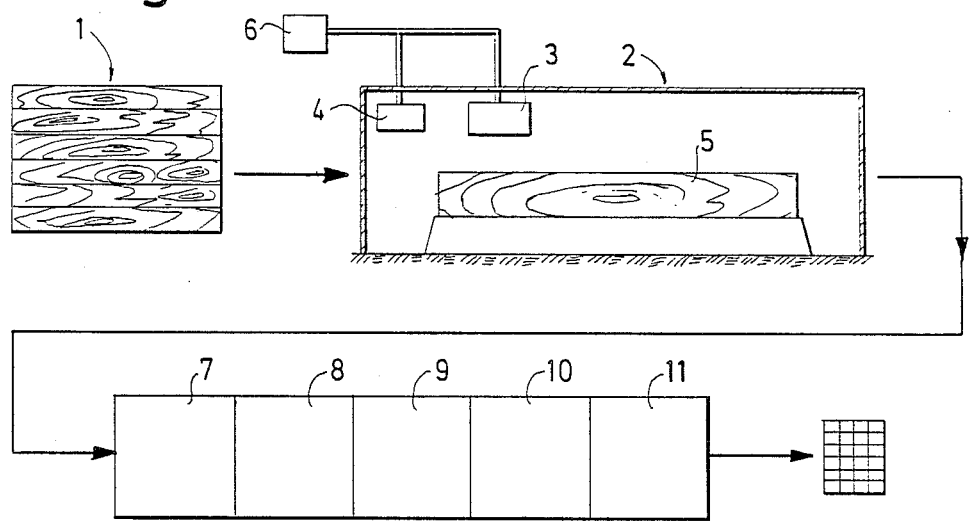
FIG. 1 shows a flow diagram for the production of casing parts, for example in the form of telephone apparatus cases and casings for hand microtelephones, etc.

FIG. 1 shows a laminated piece of timber 1, which can be of any desired type of wood, preferably being a fine-quality wood, such as for example, mahogany. Although the novel method described here is related to mahogany, it may also be used with other types of wood, for example the types of wood referred to above. FIG. 1 illustrates a plant 2 for so-called vacuum drying. The plant 2 incorporates temperature-control elements 3 and vacuum-producing elements 4 and is equipped in a previously disclosed fashion with one or more openable and closable flaps, doors or similar devices. The vacuum plant 2 is arranged to accommodate one or more pieces of timber, for example one or more planks 5, which are to be dried inside the plant 2 during a drying period.

The drying period is selected in accordance with the type of wood and is intended to provide thorough drying of the timber planks 5. The present invention is based on the concept that the timber is to be dried to an extremely low moisture content, for example, a moisture content just prior to the timber's cell collapse limit.

In detail the drying procedure is as follows. Once the piece of timber or plank has been introduced into the plant, it is heated for a long period until the timber is heated through to the core itself. Once the timber has been introduced into the plant and the latter has been closed, the temperature control elements 3 are switched on to provide a temperature of preferably about 50° C. In the case of mahogany, thorough heating will continue for about one day. Once the thorough heating process is completed the plant 2 is subjected to a vacuum by activation of the vacuum producing elements 4. Control of the temperature-control and vacuum-producing elements can be automatic, as is already known in the art, for example with the help of regulating element 6.

The timber remains inside the plant 2 under vacuum for a short time, for example 10–12 minutes. When the pressure is reduced, moisture evaporation will result at the surface, which means that the surface will become colder and moisture will be driven away from the surface of the wood. The temperature difference and the pressure difference which occur in this case mean that moisture moves from inside the wood towards the outside. This moisture movement will continue until the surface has cooled. The vacuum is interrupted after this short period and is followed by a new cycle consisting of a heating period and subsequent vacuum application. Repetition of these cycles continues until an high degree of drying of the timber has been achieved. In accordance with the invention, the drying process is allowed to continue for an unusually long period until just prior to the timber's cell collapse limit. The timber should preferably be dried to such an extent that the residual moisture content is only about 4–5 per cent by weight, as compared with normal timber drying processes that aim for residual moisture contents of 6–8 percent by weight. The 4–5% moisture content retained in the timber is sufficient to prevent cell collapse.

It is an important embodiment of the invention that at the end of the drying period the temperature is increased from about 50° C. to about 65° C.–70° C. for a short period in relation to the total drying time. During the last-mentioned temperature increase an outflowing of the resin in the wood is achieved due to the increased temperature. The intended result is a sealing of the pith fibers of the wood. Moisture is thus prevented or discouraged from reentering the core of the wood or the timber. Nevertheless, a certain degree of re-absorption of moisture is permissible during the subsequent processing of the timber. The re-absorption of moisture is limited, however, to the outer parts of the timber or the wood, and the flowing out of the resin provides wood or a timber that can be maintained in an essentially desiccated state.

The high degree of desiccation throughout all portions of the timber means that stresses which would otherwise lead to cracking and impaction within the wood are to a large extent prevented. The re-absorption of moisture by the outer parts of the wood or the timber is gradually balanced out and reduced and thus does not produce any negative effect.

In FIG. 1 various processing stations are indicated by the reference designations 7, 8, 9, 10 and 11. At the processing stations the timber which has been dried is sawn into blanks to form the finished wooden objects. The sawing can occur at station 7. Different blanks which when joined together are to form an object can also be produced at station 7. Each blank can be in the form of a single piece taken from a dried timber. The blank may consist of two or more pieces glued together which in this case have been taken from the same piece of timber or plank.

At station 8 by milling of the blank the contours of the object are produced in rough form. Station 9 is a processing station for detailed processing (for example, sanding). Station 10 is an assembly station for the different finished details. Station 11 is a varnishing station.

Figure 2A:
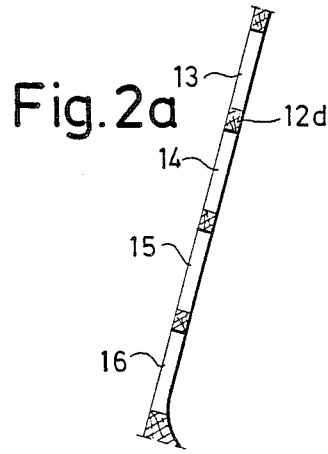
FIG. 2a shows in vertical section a detail of the case in accordance with FIG. 2.
Figure 2:
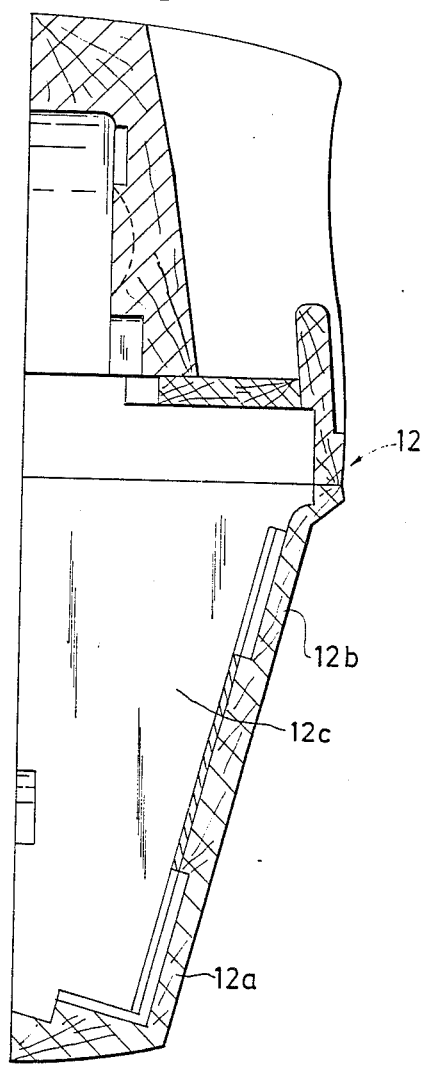
FIG. 2 shows in vertical section an example of the construction of a telephone apparatus case in accordance with the present invention.

FIG. 2 shows a vertical section through a case for a telephone apparatus, the external shape of which is at least essentially previously disclosed. FIG. 2a shows a parallel section through the same case. The parallel section in this case is taken so that it extends through the keyset of the telephone apparatus. The casing is indicated by the reference designation 12 and since its form is assumed to be as shown, it is not proposed to describe it in any greater detail here. What may be established, however, is that the casing includes the parts 12a and 12b in which the thickness of the material is for example about 3 mm. The casing in accordance with FIG. 2 is connected to a component (not shown) of the telephone apparatus in question. The component and the casing are intended for use as a container for telecommunications equipment which extends at least essentially into the casing cavity 12c. The thickness of the material at the part 12d in accordance with FIG. 2 is also essentially reduced. Parts 12d are arranged to provide rows and columns of holes 13, 14, 15 and 16. The strings of parts 12d are reinforced by means of reinforcing elements (not shown) but consisting for example of glued and cross-laminated veneer. The strings of parts 12d which are cut in the longitudinal direction of the wood are provided with reinforcement from the reinforcing elements, the transverse direction of which extends at right angles to the direction of the wood. The actual wood of the case absorbs stresses in one principal direction, while the reinforcing element absorbs stresses in the opposite direction. Thin areas of material in the case can be reinforced in a similar fashion.

Figure 3:
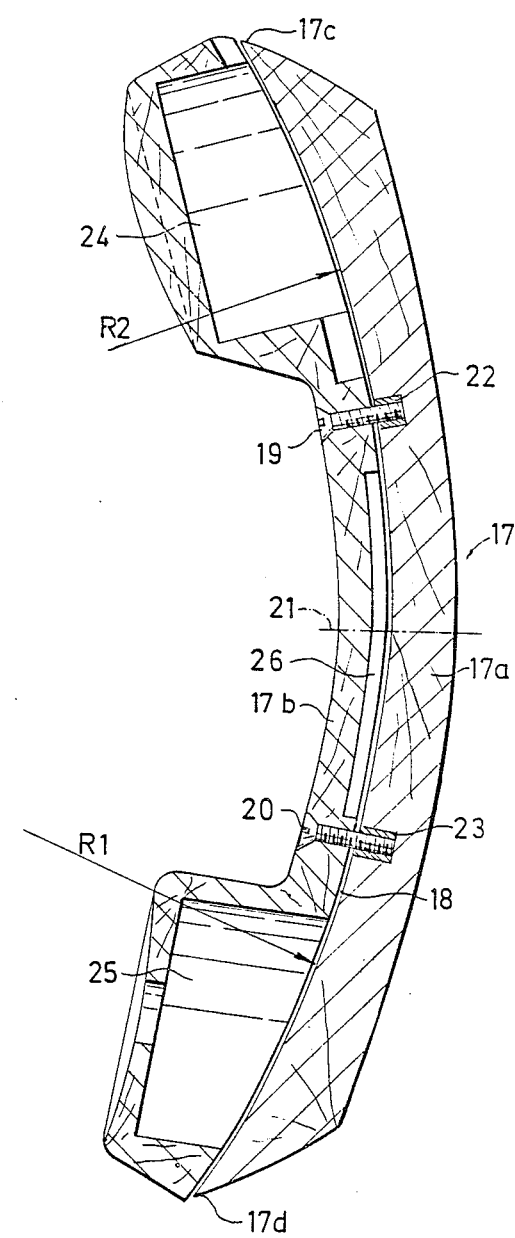
FIG. 3 shows a vertical section through a hand microtelephone and casing which has been constructed in accordance with the present invention.

FIG. 3 shows a casing in the form of a hand microtelephone having a previously disclosed external shape. The hand microtelephone 17 consists of two parts which are connected at a dividing plane 18 and extend in the longitudinal sense in respect to components 17a and 17b and at right angles to the plane of the paper in FIG. 3. The dividing plane has a curved shape in the plane of the paper. The upper part 17a is provided with a radius R1 which is smaller than the corresponding radius R2 of the other component 17b. This arrangement of different radii means that the components can be held together by securing elements 19 and 20 which are positioned close to the center 21 of the hand microtelephone and at the same time insure reliable contact along the entire dividing plane of the components. In spite of the comparatively central positioning of the securing elements 19 and 20, reliable sealing is achieved at the outer ends 17c and 17d. The securing elements consist of cylindrical screws which are screwed into bushings 22, 23 and are preferably made of metal.

The ear-phone component of the hand microtelephone comprises a first space 24 for the ear-piece unit and a second space 25 for the microphone components. Also present inside the hand microtelephone is a long groove 26 to accommodate the wires between the components.

Figure 4:
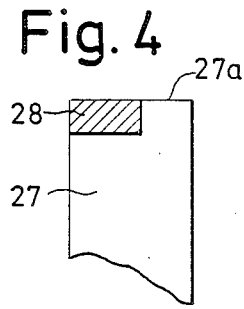
FIG. 4 shows in detail a component, for example a telephone apparatus case having a free end surface.

FIG. 4 shows the free end edge 27 of a telephone apparatus case in accordance with FIG. 2. In order to prevent the wood from cracking from the end edge 27a as a result of impact, the end edge is reinforced with a reinforcing element 28, preferably in wood, of the same or a different type. In this embodiment, the reinforcing element 28 is inserted into the component 27 but may, of course, also be arranged to extend over the entire surface 27a. The reinforcing element is provided to effectively block any internal stresses and prevent the stresses from causing cracking or warping in wood which has been taken from portions of the timber or plank where the grain is oblique.

The invention is not restricted to the embodiment described above by way of example, but may undergo modifications within the context of the following patent claims and the idea of the invention.

I claim:

1. A method of manufacturing casing from wood comprising low-temperature heat treatment steps and subsequent casing forming step,
    said low temperature heat treatment steps including:
    drying a wooden member at a first temperature of about 50° C. by a series of drying periods and alternating vacuum periods, to obtain a moisture content from about 4 to about 5%, sufficient moisture being retained to prevent cell collapse of wood in said wooden member;
    heating said dried wooden member at a second temperature of about 65° C. so as to seal pith fibers of the resin released from said wood during said heating to prevent re-absorption of moisture; and
    forming step including forming a casing from said wood member.

2. A method of manufacturing casing from wood according to the claim 1 further comprising a finishing step of reinforcing said casing by gluing, cross-lamination, and coating said casing with varnish for sealing the surface pores of said wood whereby contraction and expansion due to atmospheric conditions have been substantially eliminated.

3. A method according to claim 1 wherein the time period for drying said wooden member at said first temperature is selected in a range from about 5 to 75 days.

4. A method of manufacturing a casing from wood comprising the steps of:
    drying a wooden member at a first low temperature of about 50° C. to about 65° C. to a moisture content of from about 4 to about 5%, said wooden member being dried at said first temperature for the period of time necessary to have the core heated and subsequently subjecting said member to a vacuum treatment, the cycle being repeated until said wood in said wooden member reached said moisture content of about 4-5%, sufficient moisture content being retained to prevent cell collapse of said wood;
    a heating step subsequent to said drying step, consisting of heating said dried wooden member at a second temperature in the range of about 65° C. to about 70° C. so as to seal pith fibers by the resin released from said wood during said heating to prevent reabsorption of moisture;

and forming a casing from said wooden member.

5. A method according to claim 4 further comprising a step of reinforcing said casing by gluing, cross-lamination, and coating said casing with varnish for sealing the surface pores of the wood whereby contraction and expansion due to atmospheric conditions are substantially eliminated.

6. A method according to claim 4 wherein said drying period is selected in a range of about 5 to 75 days.

7. A method of manufacturing casing from wood, comprising:

drying a wooden member at a first low temperature of about 50° C. to about 65° C. to obtain a moisture content from about 4 to about 5%, sufficient moisture being retained to prevent cell collapse of wood in said wooden member;

subjecting said dried wooden member to a subsequent, second low temperature sealing treatment wherein said wood member is heated at said second temperature of about 65° C. about 70° C. so as to seal fibers by resin released from said wood from said heating to prevent reabsorption of moisture; and forming a casing from said wood member.

* * * * *